Feb. 21, 1950 W. W. DAVIS 2,498,030
LINEAR MEASURING DEVICE HAVING
LIGHT PROJECTION MEANS
Filed May 2, 1946 2 Sheets-Sheet 2
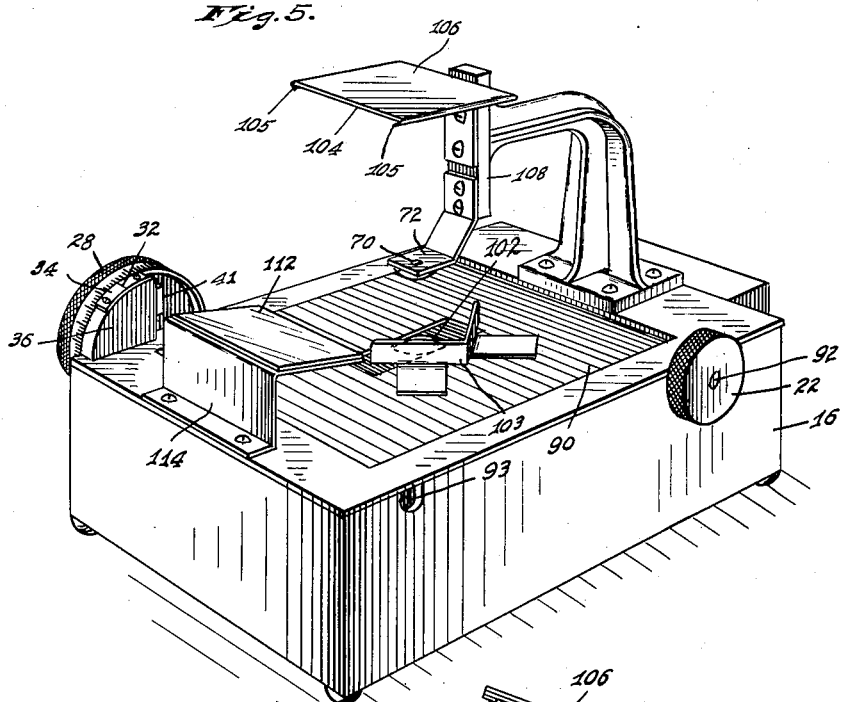
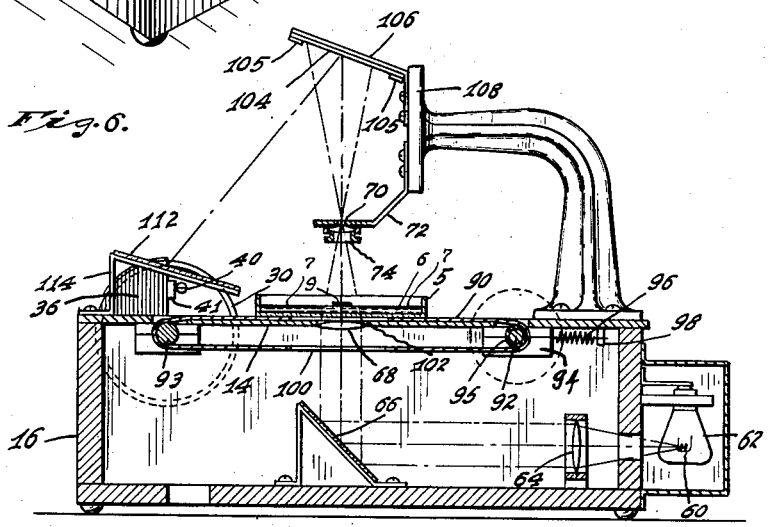
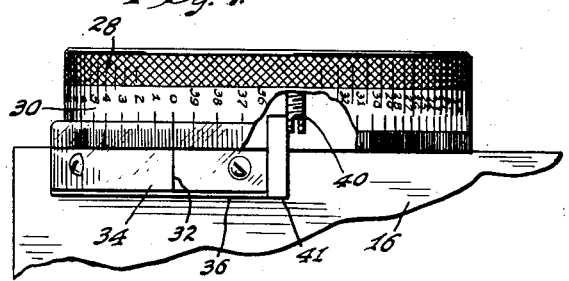
INVENTOR.
WILLIAM W. DAVIS,
BY
ATTORNEY.

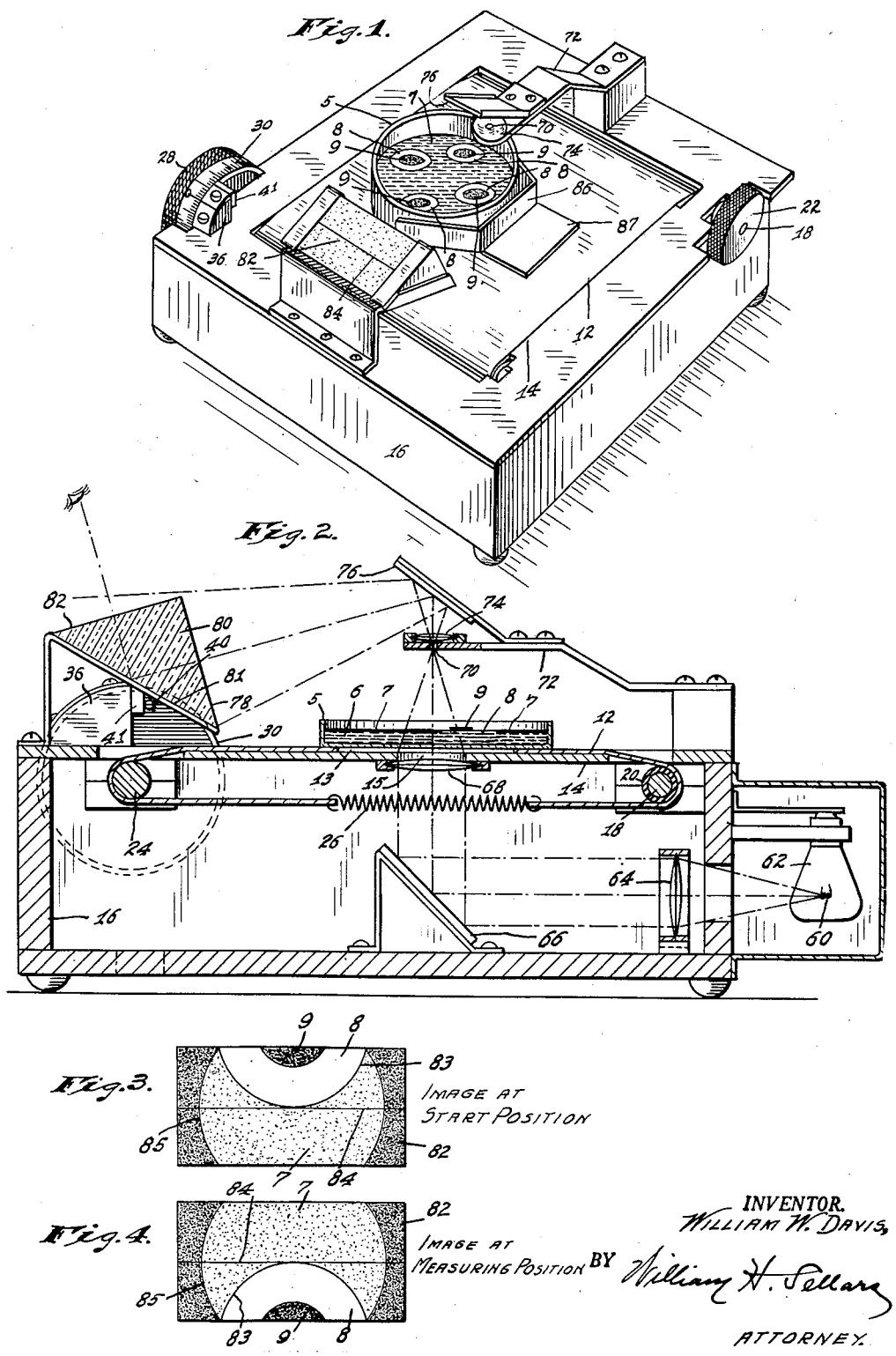

Patented Feb. 21, 1950

2,498,030

UNITED STATES PATENT OFFICE 2,498,030

LINEAR MEASURING DEVICE HAVING LIGHT PROJECTION MEANS

William W. Davis, Greenwood, Ind., assignor to Eli Lilly and Company, Indianapolis, Ind., a corporation of Indiana Application May 2, 1946, Serial No. 666,672

4 Claims. (Cl. 88—14)

This invention relates to the measuring of a linear dimension of an area or of a body having a relatively flat surface by operations which involve the use of an image of such area or body (or a portion thereof) projected on an inspection surface provided with a reference mark which may correspond to zero position of a measurement indicator.

This invention relates especially to the measurement in a light-permeable body of an area possessing different light refractory properties from the adjacent areas of the body, and particularly to the measurement of an area over which an antibacterial agent prevents bacterial growth in a test body.

In order to test the bactericidal properties of various lots of penicillin or other antibiotic agents such as streptomycin, there is provided in a substantially transparent receptacle such as a petri dish, a non-liquid, bacterial nutrient medium inoculated with a suitable test organism, for example, Staphylococcus aureus. A number of small circular disks of absorbent material are placed in spaced relation on the surface of the "seeded" agar. Then (using penicillin as an example), upon one or more of these disks is dropped a definite amount of a penicillin solution selected as a standard from the standpoint of its efficiency as a bactericide. Upon two or more of the remaining disks there is placed the same definite amount of a penicillin of unknown bactericidal potency. The penicillin diffuses from the disk into the nutrient medium and inhibits bacterial growth so that surrounding each disk is a roughly circular area devoid of bacterial growth and corresponding in size to the potency of the penicillin preparation. Thus a measure of the effectiveness of any unknown penicillin solution may be arrived at by measuring and comparing corresponding linear dimensions of the clear areas produced by inhibiting the bacterial growth on the surface of the agar around disks to which standard and unknown penicillin solutions have been selectively applied.

Hence it is an object of this invention to provide means for quickly and accurately measuring workpieces such as the zones of inhibition of various antibiotics in solution as indicated by the clear, approximately circular areas surrounding the disks in test bodies such as the agar plates described above.

However, it is to be understood that my invention, and various important features thereof, may have other applications and uses with other workpieces. For example, if a culture of a given bacteria suspended in a solid nutrient medium in a transparent parallel-faced capillary tube be incubated in contact with a solution of penicillin from which penicillin is allowed to diffuse into said nutrient material from one end of said capillary tube, the nutrient material after a fixed time, due to the inhibitory effect of penicillin, will be clear of bacterial growth for some distance from the end of the tube, which distance depends upon the bactericidal action of each selected penicillin solution. Measurement of the length of the clear portion of the nutrient medium within said capillary tube, as readily performed with the aid of either of the illustrative embodiments of my invention, will make possible grading of penicillins of unknown bactericidal action, by making similar tests with the same bacterial culture in the same nutrient medium in other similar capillary tubes in contact with the other penicillin solutions and comparing the results of measuring operations, using the first-mentioned tube as the standard—the longer the clear portion in a capillary tube, the higher the grade of the penicillin undergoing the test.

To these ends, and in accordance with an important feature of the invention, there is provided means for projecting a beam of light through the area or body to be measured or alternatively through or past more or less widely-spaced marginal portions of such area or body so that an image of said area or body or of a selected portion or portions thereof may be projected upon an inspection surface where it or they may be inspected and accurately positioned with respect to a reference line corresponding to zero position on an associated indicating means, so related to a workpiece supporting and/or moving means that, upon movement of the latter to effect movement of the workpiece and of its image with respect to said reference line, said indicating means is simultaneously operated to present to the operator the result of the measuring operation as soon as the movement of the image across said reference line is completed.

In the drawings—

Fig. 1 is a perspective view of a measuring machine illustrating the invention;

Fig. 2 is a vertical sectional view in the median line from front to rear of the machine shown in Fig. 1;

Fig. 3 is a plan view of an enlarged image of a workpiece such as a zone (on a bioassay plate), showing the starting position with respect to a fixed line on an inspection surface;

Fig. 4 is a similar view showing the image of the zone in its final or measuring position;

Fig. 5 is a view similar to Fig. 1 showing another embodiment of the invention;

Fig. 6 is a sectional view of the machine shown in Fig. 5, the view being similar to Fig. 2; and Fig. 7 is an enlarged view of the indicating means shown at the left in Figs. 1 and 5.

As indicated above and as shown in the drawings of this application, the workpiece to be measured may be a zone of inhibition produced by a penicillin solution of a standard or of an unknown strength. In making the test of the strength of a penicillin solution of unknown bactericidal efficiency, a plate or a petri dish 5 is supplied with a layer of nutrient material, such as agar 6, mixed with a culture of suitable bacteria. Under suitable conditions, a growth of bacteria appears on the surface 7 of the agar except in those areas where penicillin has exhibited its inhibitory action. This growth at a certain stage is quite distinct in appearance and in light-dispersing properties with respect to clear areas or zones 8 on the surface 7 of the agar produced by the effect of penicillin solutions on said bacterial growth. For this purpose, there is placed on the surface of the "seeded" agar, before incubation thereof, a number of disks 9, of suitable material such as paper, which are liquid absorbent and to which a certain definite amount of the standard and of the unknown penicillin solutions is selectively applied. The penicillin of this solution spreads outwardly through the agar by diffusion around the disks 9 and maintains a clear area or zone 8 of a size corresponding to the strength of the penicillin in its inhibitory or bactericidal action.

Preferably a standard solution in two concentrations is applied to two disks 9 side by side so that the zones associated therewith may be measured in succession and recorded for comparison with the measurements of zones of an unknown penicillin supplied in two concentrations, corresponding to those of the standard, to two other disks in the same petri dish.

Upon reference to Figs. 1 and 2, illustrating one embodiment of my invention, it will be observed that a plate or petri dish 5 is shown in position on a work support in the form of an endless movable belt 12 the latter having an upper run, with an elongated opening 13 therein, which is movable over a stationary supporting plate 14 carried by the frame 16 of the machine. For a purpose which will be hereinafter described, the table or plate 14 has a circular opening 15 therein. As shown the belt 12 passes over a rear shaft 18 which is covered by a sleeve 20 of rubber or other material having the necessary frictional quality to insure movement of the belt 12 upon rotation of the shaft 18, a manually operable wheel or knob 22 being secured to one end of the shaft 18 to effect necessary movements or adjustments of the belt 12. At its front end the belt 12 passes around a second shaft 24 rotatably mounted in bearings in the machine frame, said shaft being smooth-surfaced (at least, its surface possesses a frictional quality much less in degree than the surface of sleeve 20 on shaft 18) for a purpose that will presently appear. In the construction shown in Fig. 2, the belt 12 is tensioned so as to be kept in sufficiently firm contact with the shaft 24 and with the sleeve 20, to insure its being driven by either of the shafts 18 and 24, by means comprising a plurality of springs 26 which form a part of the endless belt, there being at least two of such springs, one adjacent each side edge of the belt. Secured to the shaft 24 is a second handwheel 28 by means of which the belt may be moved in adjusting the petri dish 5 with respect to the image-forming means presently to be described. Also secured to the shaft 24 is a rotary scale member 30 which is normally in zero position as indicated in Figs. 1 and 7 wherein an indicator or pointer is provided in the form of a relatively heavy mark 32 carried by a transparent curved strip 34 secured to a block 36 carried rigidly by the frame 16. Conveniently a stop 40 (Figs. 2 and 6) is secured to the rotary scale member 30 to contact a fixed stop 41 projecting laterally into the path of stop 40 from the vertical face of the stationary block 36 thereby to stop the rotary scale member 30 in zero position.

A petri dish 5 containing agar and a number of circular disks 9 is placed upon the belt 12. The said dish 5 may be adjusted to its proper starting position for the measuring operation by turning the handwheel 22 thus moving the belt 12, while the rotary scale member 30 is manually held in zero position against the fixed stop 41, this being possible by reason of the fact that the front shaft 24 is smooth-surfaced so that the belt slips with respect thereto.

As indicated above, measurement of each zone of inhibition 8, caused by application of a penicillin solution selectively to the disks 9 on the surface of the agar, is effected through successive aligning operations of opposite edge portions of an image of each such zone in the petri dish. For this purpose, there is provided means for projecting a beam of light through vertically aligned openings in the plate 14 and in the upper and lower runs of the belt 12, a petri dish 5 being shown in position over said openings and resting on the upper surface of the belt 12. Such a beam of light may have its source in a filament 60 in an electric lamp 62, the said filament being small and highly incandescent, such as that commonly found in an automobile headlight bulb. Light from the filament 60 passes through a converging lens 64 whereby parallel rays of light are caused to strike a reflecting surface 66, arranged at a 45° angle to the vertical, so that said rays are directed vertically through a second convex or converging lens 68 located below the openings in the plate 14 and the belt 12. As shown, the light which passes through the converging lens 68 is brought to a focus closely adjacent to an opening 70 in a diaphragm 72 positioned directly over the aligned openings in the belt 12 and plate 14. This opening 70 is relatively very small, of the order of about 3 mm. in diameter, for reasons to be presently set forth. Supported by the diaphragm 72, in proper alignment with the opening 70 is a converging lens 74 through the center portion of which the beam of light passes to produce a diverging beam on a highly reflecting surface such as that provided by a mirror 76. From the mirror 76 the beam is reflected to and through a transparent surface 78 of a prism 80, the light rays being reflected upwardly from an inclined surface 81 of the prism to a ground glass surface 82, the latter serving as a screen upon which an image of the workpiece will appear when the latter is in proper position on the belt 12. As shown, there is provided a reference line 84 extending across the middle of the screen surface 82, the said line being parallel with the axis of the prism 80.

It will be readily understood that, with one of the inhibition zones 8 positioned in the path of the light beam passing through openings in the work support, an image of the zone or of a portion thereof will be reflected from the mirror surface 76 and will appear much enlarged upon the screen surface 82, such positioning of the zone being facilitated by the beam of light which indicates quite accurately the proper position for any one of the zones in a petri dish 5.

To secure the proper starting position for measurement of the zone, the operator turns the handwheel or knob 22 to move the belt 12 and thus bring an edge 83 of the image of the zone 8 just into contact with the reference line 84 on the screen or inspection surface 82 as clearly shown in Fig. 3. During this movement of the belt, the rotary indicator 30 is held in zero position, against the fixed stop 41, by the left hand of the operator so that measurement may always start from zero position. The next step is to move the belt and hence the zone 8 in such manner that the image of the zone is caused to travel clear across the reference line 84 from the starting position shown in Fig. 3 to its final position shown in Fig. 4. The rotary indicator or scale member 30 moves with the belt, being frictionally driven thereby through the shaft 24, so that the extent of movement of the zone 8 and therefore the width or other linear dimension thereof is indicated by the final position of the rotary scale or indicator 30 with respect to the pointer 32 (Fig. 7). It should be pointed out that the handwheel 28 may be used to turn the shaft 24 and thus cause simultaneous operation of the belt 12 and of the rotary scale member 30.

Having measured one of the zones, the petri dish 5 is shifted to bring another workpiece or zone 8 over the circular beam of light coming up through the openings in the belt 12 and plate 14 (said circular beam of light being represented at 85 in Figs. 3 and 4), whereupon the operations are repeated to secure measurement of such zone, it being important in each case that the rotary scale 30 be held in zero position during that adjustment of the belt which brings the zone to its starting position as indicated by its image in relation to reference line 84 on the inspection surface 82 in Fig. 3. Since the measuring movement of the belt starts from its zero position, arrived at by the described adjustment movement thereof, the stop members 40, 41 may be regarded as zero-positioning means for the belt in the sense that they secure coordinated positioning of the belt and of the indicator in zero positions as a preliminary to the measuring movements of the belt and indicator.

To facilitate positioning of the petri dish and of the various zones 8 therein with respect to said openings in the endless belt, there is provided a guide member 86 secured to the upper surface of the upper run of the belt 12, in fixed relation to the opening in said upper run of the belt, by means of a lateral flange 87 integral with the middle upright wall of the guide member. Preferably and as shown, the guide member comprises three upright walls which are so related to each other and to a petri dish of the usual size that the latter, when placed against said walls, is held against movement in both a lateral and a fore-and-aft direction with respect to the opening in the upper run of the belt. The guide member 86 makes it easy to shift the petri dish in a rotary direction to bring another zone 8 over the beam of light since by pressing the petri dish lightly against said walls of the guide no movement of the dish other than the rotary one is permitted.

In that embodiment of my invention shown in Figs. 5 and 6, a belt 90 is provided for supporting and moving a workpiece in a manner exactly like that disclosed in connection with the belt 12 in Figs. 1 and 2. This belt 90, however, is a one-piece endless belt, that is, it has no spring portion such as that provided by springs 26 in Fig. 2 which have the function of tensioning the belt 12 to insure proper driving thereof by the shafts 18 and 24, respectively. In Fig. 6, the belt 90 is properly tensioned by having its rear shaft 92 mounted in movable bearings 94, these bearings being drawn yieldingly toward the rear of the machine by springs, one of which is shown at 96 as attached at one end to a bearing 94 and at its other end to a pin 98 secured to the machine frame 16, thus providing a simple means for holding the belt 90 under tension. In other respects shafts 92 and 93 are similar to shafts 18 and 24 of Fig. 2, the shaft 92 having a friction sleeve 95 while shaft 93 is smooth surfaced. In order that a beam of light may be projected upwardly through the workpiece on the upper run of the belt 90, the latter is provided with aligned openings therethrough indicated at 100, 102. To facilitate positioning of a workpiece on the belt, a guide member 103 is secured to belt 90 in fixed relation to the upper opening 102 in said belt. As shown the shaft 92 is provided with a manually operable wheel 22, as in Fig. 1, while the shaft 93 is provided with a manually operable wheel 28, and also a rotary indicator or scale member 30 as in Fig. 1. While the belt 90 may be made of transparent material, there is no advantage in doing so since it does not remain transparent due to dust and other foreign material and to scratches which accumulate during use.

The image produced by passing a beam of light upwardly through the workpiece on the belt 90 (Figs. 5 and 6) is formed on a screen 104 carried by a plate 106 adjustably secured to a vertical surface on a bracket 108 carried by the machine frame 16. The screen 104 may be a piece of white paper of a suitable size to fit within inturned lips 105 (Fig. 5) adapted to slidably receive such paper, the latter having a reference line extending clear across the exposed face of the paper, such line being parallel with the shafts 92, 93 and serving to indicate the starting and the measuring positions of the image of the zone 8 with respect to the measuring or indicating means just as in the case of reference line 84 on screen surface 82 (Figs. 1, 3 and 4). In order to enable the operator to inspect the image on the screen or inspection surface 104, there is provided a mirror 112 mounted on a bracket 114 at the front of the machine. Upon looking into the mirror 112, the operator is enabled to inspect the enlarged image of the zone 8 cast on the under side of the screen 104. The first operation is to adjust the image of a zone 8 with respect to the reference line on the screen, this being done by proper manipulation of the manually operable wheel 22, during which the image is adjusted to starting position with respect to such line just as the zone image is adjusted with respect to the line 84 on the screen 82 in Fig. 3. During this adjustment, the wheel 28 (Fig. 5) and indicator wheel 30 are held in zero position just as in the corresponding adjustments in connection with the belt 12 and its supported workpiece in Fig. 1. To effect measurement of the zone appearing as an image on the under side of the screen 104, the wheel 28 is turned and with it the indicator wheel or rotary scale 30 thus driving the belt 90 (Fig. 6) and moving the workpiece and perforce the image on the screen 104 until said image of the zone 8 has moved clear across the reference line on said screen to a position corresponding to the zone 8 and the line 84 in Fig. 4, whereby a linear dimension (in this case a width dimension) of the zone 8 has been measured and indicated by the indicator wheel 30, in relation to the pointer 32 (Fig. 7).

The rollers or shafts 24 and 93 at the front ends of the belts 12 and 90, respectively (Figs. 2 and 6), are each one half inch in diameter. Hence one complete turn of the roller will cause the associated belt to move 40 mm., approximately. If the rotary indicator or scale member 30 be 3½ inches in diameter, its circumference would be about seven times that of the shaft to which it is fastened. Hence if the 40 mm. travel of the belt accomplished by one complete rotation of the shaft (24 or 93) be indicated by means of an enlarged scale (provided by dividing up the circumference of the member 30 into 200 uniform units of length, as indicated in Fig. 7 of the drawing) it will facilitate reading of the indicator scale in millimeters and tenths of a millimeter.

It is to be noted that parallax is eliminated by having the image of a zone 8 and the reference line 84 both superimposed upon the same surface 82 which serves as the inspection surface in that species of the invention disclosed in Figs. 1 and 2. The above statement is also true, with respect to the absence of parallax, in the species of the invention disclosed in Figs. 5 and 6, since the image of a zone 8 appears on the screen or inspection surface 104 (Fig. 6) which is provided with a reference line thereacross as described above. While the operator must look in the mirror 112 in order to see the image on the screen 104, the latter is the true inspection surface upon which the image and the reference line are superimposed. If the screen 104 be made of a sheet of translucent material, and with a reference line thereacross, similar in its operative effect to the surface 82 on the prism 80, no mirror would be required since the operator could look down upon the upper surface of such a screen or inspection surface and observe the image of the workpiece in relation to the reference line. It will be readily understood that the absence of parallax contributes very definitely to both accuracy and speed in the necessary matching of the image and the reference line incident to measuring operations.

In Fig. 6 of the drawings, the diaphragm 72, which serves as a support for the lens 74, has an opening 70, just as in the corresponding diaphragm of Fig. 2. However, in this view (Fig. 6) the converging lens 74 is shown as located below the opening 70, instead of above it as in Fig. 2, this being for the purpose of emphasizing that the converging lens may be in either position since the rays of the beam are passing through only the middle portion of said lens 74 and hence making it immaterial whether the lens 74 be above or below the opening, 70. In each case, an image of a zone is projected on the screen 82 (Fig. 1) or screen 104 (Fig. 6).

The purpose of having the opening 70 of such a very small diameter, i. e. of the order of about 3 mm., is to shield the screen or inspection surface (82 or 104) from dispersed light, that is, from rays of light dispersed by particles or bacterial growth on the surface of the agar. In other words, the diaphragm 72 with its small opening 70 serves as a shield so that, with few exceptions, only the direct rays from the filament 60 passing through the convex lens 68, will also pass through the opening 70, thereby contributing very materially to the desired sharpness of the line separating the clear area or zone 8 (Figs. 3 and 4) from the area of bacterial growth 7 on the surface of the agar, it being obvious that a large opening at 70 would permit many dispersed rays of light to pass through to the image on the screen (82 or 104) thereby rendering the image on the screen more subject to diffused light with resulting loss in contrast at the curved dividing line between the two specified areas and thus making it somewhat more difficult to determine the exact boundary of the clear area or zone 8, so that measurement of the zone would require more time and probably be less accurate in the desired measuring operations than is the case with my arrangement of these elements of the optical mechanism.

In a preferred form of the invention, the source of light is provided by a short (compact) highly incandescent filament 60 in the electric lamp 62. It provides a "spot" source of light of high intensity in an arrangement in which the size of such "spot" source of light is substantially that of the opening 70 in the diaphragm 72, so that all the light rays from said "spot" source (which are focused near said opening by the converging lens 68) also pass through said opening and through the center portion of the converging lens 74. The result is seen in an image of the workpiece or of marginal portions thereof appearing on the inspection surface 82 or 104 in light of such relatively high intensity that such image may be readily observed in its relation to the reference line on said inspection surface, under ordinary lighting conditions in the laboratory and in the workrooms forming part of a penicillin production plant. This is a decided advantage since operation of my measuring machine, including proper positioning of the petri dish therein, observation of the measurement indicator and the recording of measurements are all facilitated by proper lighting conditions.

As indicated above, measurement is carried out upon one or more zones 8 produced by a standardized penicillin solution and then measurement is made of zones produced by an unknown penicillin solution so that by comparison of the results the strength of the unknown penicillin may be determined, and the latter graded accordingly.

While the illustrated embodiments of my invention will, in all likelihood, be chiefly applied in measurements of zone dimensions in the microbiological testing of antibiotics, such as penicillin and streptomycin, it will be readily understood that certain features of my invention as herein disclosed are capable of being used in quite another way. For example, if the reference line 84 on the inspection surface 82 (Fig. 1) or the corresponding reference line on the inspection surface or screen 104 (Fig. 6) be divided into sections, for example 4 mm. in length, by short parallel lines extending at right angles to said reference line, the said inspection surface or screen may be utilized in counting the colonies of bacteria present in a nutrient medium in a petri dish, simply by placing the petri dish over the beam of light coming up through the work support, thereby causing an enlarged image of a portion of the petri dish and its contents to appear on the inspection surface, aligning any selected portion of the medium with the reference line, and then moving the work support and dish more or less slowly and progressively as the counting proceeds until the dish has been moved through the desired distance, e. g. 20 mm., as may be readily carried out by turning the rotary scale member 30. Obviously, if the operator counts the colonies between any two adjacent lines while the dish is moving through a distance of 20 mm., subsequent to the initial alignment with respect to the reference line on the inspection surface, the result is that counting of the colonies has taken place over a definite area, 4 mm. wide and 20 mm. long. Depending upon the number and disposition of the colonies in a given area as determined by casual inspection, the operator may decide to count in a strip of 4 mm. width, if the colonies are rather thickly presented, or in a strip of 6, 8 or 10 mm. in width when the colonies are widely spaced.

I claim:

1. In a measuring machine, a belt serving as a work support and having an opening through the run of the belt on which a workpiece is positioned, a member having an inspection surface with a reference line appearing thereacross, means for projecting an image of the workpiece upon said inspection surface, means for adjusting the belt to bring an edge of the image into contact with said line, means for causing movement of said belt whereby the image of the workpiece may be caused to travel clear across said line on the inspection surface until the opposite edge of the image is in contact with said line, and an indicator having a frictional driving connection with said belt so that said indicator may be positioned and held at zero during adjustment of the belt and so that said indicator may be hand-operated to cause that movement of the belt which brings the image to its second position with respect to said line, said indicator being then in position to indicate the extent of the last-mentioned movement of the belt whereby measurement of a linear dimension of the workpiece is effected.

2. In a measuring machine, an endless belt serving as a work support and having aligned openings through the upper and lower runs of the belt over which a workpiece may be placed; a member having an inspection surface with a reference line appearing thereacross; means for projecting a beam of light through said aligned openings to cause an image of the workpiece to appear upon said inspection surface, adjustment being made to bring one edge of the image in contact with said line in the first or starting position of said image; means comprising a manually operable member for causing movement of said belt whereby the image may be caused to travel clear across said line on the inspection surface until the opposite edge of the image in its second position appears in contact with said line; and an indicator comprising a pointer and a rotary scale member, the latter having a frictional driving connection with said belt so that said rotary scale member may be positioned and held at zero while the image is being placed in its first or starting position with respect to said line on said inspection surface and so that said rotary scale member may be driven during movement of the belt and of the workpiece to the second position of the image with respect to said line whereby measurement of a linear dimension of the workpiece is effected.

3. In a measuring machine, an inspection surface having a reference line thereacross; a diaphragm having a relatively small opening therethrough of the order of about 3 mm.; a converging lens in juxtaposition to said opening; a "spot" source of high intensity light, said source of light being substantially the same in size as said opening in the diaphragm; a support having an opening over which a workpiece may be supported, a convex lens located below and in alignment with said opening and operative to bring light rays passing therethrough and through the workpiece to a focus closely adjacent to said small opening in the diaphragm, means for projecting an intense beam of light rays from said "spot" source of light to and through said convex lens, thereby causing in conjunction with said converging lens a sharply defined image of said workpiece to appear on said inspection surface; means for causing relative movement between the workpiece and said inspection surface whereby the image of the workpiece may be moved to contact said reference line on the surface; and indicator means controlled by said means for causing relative movement between the workpiece and the inspection surface for indicating the extent of movement of the workpiece during which the image is caused to move bodily across said reference line whereby measurement of a linear dimension of said workpiece is effected.

4. In a measuring machine, an endless belt serving as a movable work support and having aligned elongated openings in the upper and lower runs of said belt; means for projecting a beam of light through a workpiece placed on said belt and over the openings therein; a member having a reflecting surface; a member having a screen surface upon which an image of the workpiece is caused to appear, said screen surface having a reference line thereacross, the construction and arrangement being such that movement of the workpiece is accompanied by movement of the image relative to said line; and indicator means comprising a pointer member and a scale member, one of the two last-mentioned members having a frictional driving connection with said belt so that it may be held in zero position during movement of the belt in preliminarily adjusting the image with one edge thereof in apparent contact with said line and driven by said frictional connection to indicate the amount of movement of the workpiece with respect to said line.

WILLIAM W. DAVIS.

REFERENCES CITED

The following references are of record in the file of this patent:

UNITED STATES PATENTS

| Number | Name | Date |
|---|---|---|
| 480,245 | Boyer | Aug. 9, 1892 |
| 1,908,990 | Ledig | May 16, 1933 |
| 1,959,537 | Kuhne | May 22, 1934 |
| 2,097,783 | Cole | Nov. 2, 1937 |
| 2,302,224 | Jones | Nov. 17, 1942 |

FOREIGN PATENTS

| Number | Country | Date |
|---|---|---|
| 86,250 | Sweden | May 5, 1936 |

OTHER REFERENCES

Bausch & Lomb Catalog D-27, published 1938 by Bausch & Lomb Optical Company, Rochester, New York, pages 14, 15, 18, 19 and 23.